United States Patent [19]

Peterson

[11] 3,881,673

[45] May 6, 1975

[54] TENSIONING DEVICE

[75] Inventor: Harley G. Peterson, La Crescenta, Calif.

[73] Assignee: Joy Manufacturing Company, Pittsburgh, Pa.

[22] Filed: Feb. 15, 1974

[21] Appl. No.: 442,752

[52] U.S. Cl. .................. 248/94; 55/378; 248/327
[51] Int. Cl. ............................................ B01d 46/06
[58] Field of Search ............ 248/58, 59, 60, 94, 95, 248/317, 327; 55/378, 379

[56] References Cited
UNITED STATES PATENTS

| | | | |
|---|---|---|---|
| 480,744 | 8/1892 | Robb | 248/317 |
| 726,636 | 4/1903 | Carll | 248/58 |
| 766,890 | 8/1904 | Newberg | 248/59 |
| 1,577,133 | 3/1926 | Learnikan | 248/317 |
| 1,726,244 | 8/1929 | Shefstead | 248/58 X |
| 1,924,353 | 8/1933 | Fitzpatrick | 248/59 |
| 2,768,804 | 10/1956 | Keller | 248/59 |
| 3,127,147 | 3/1964 | Spangenberg | 248/327 |
| 3,812,660 | 5/1974 | Vanderhoech | 248/327 X |

FOREIGN PATENTS OR APPLICATIONS

| | | | |
|---|---|---|---|
| 1,585,940 | 2/1970 | France | 55/378 |
| 58,220 | 6/1923 | Sweden | 248/317 |
| 624,155 | 1/1936 | Germany | 248/60 |

*Primary Examiner*—William H. Schultz

[57] ABSTRACT

A tensioning device and more particularly an improved supporting and tensioning means adapted to support a filter bag in a baghouse gas filtering apparatus.

9 Claims, 4 Drawing Figures

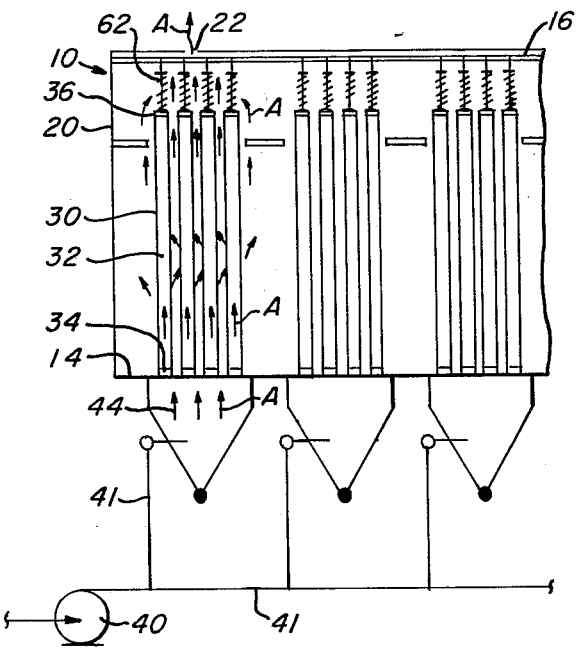
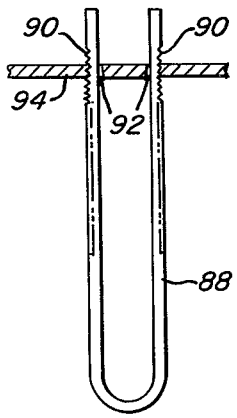
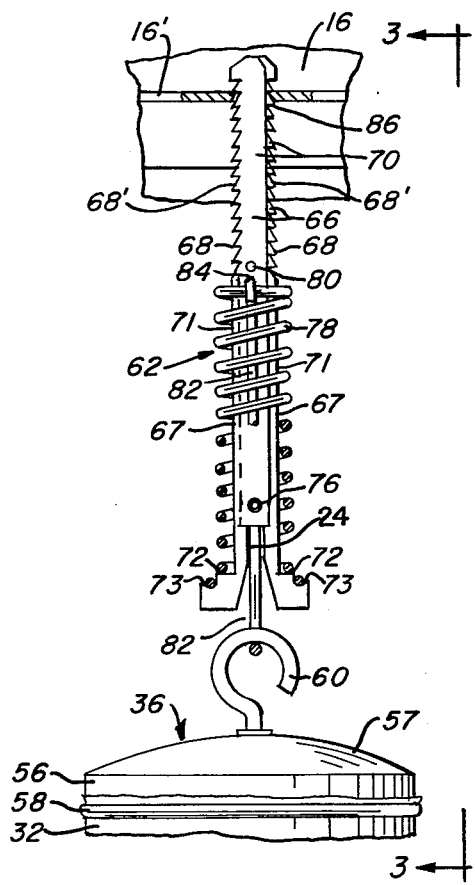
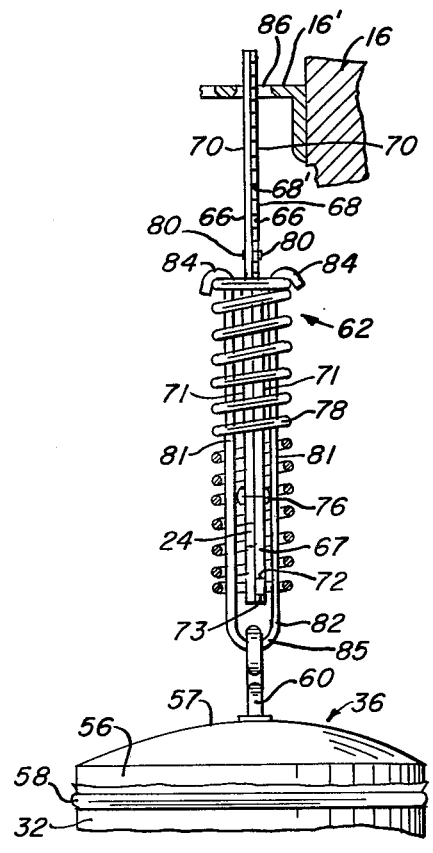

TENSIONING DEVICE

In the art of gaseous effluent cleaning it is well known to utilize a gas filtering apparatus comprising a baghouse enclosure which houses a plurality of elongated tubular filter bags. Such filter bags typically are maintained in longitudinal tension for a variety of well known reasons, for example to preclude chafing of adjacent filter bags, to prevent collapse of filter bags during reverse-flow operations such as filter bag cleaning and to maximize the filter surface area exposed to the passing gas stream.

According to the present invention the filter bags of a baghouse apparatus are supported in tension at their respective upper ends by a simplified bag retaining and tensioning device which provides numerous advantages over many prior art filter bag supports. For example in normal use filter bags must be replaced periodically as they fail or become inefficient through wear. The time required for such bag replacement is often needlessly increased by the slow and cumbersome operation of such prior art tensioning devices as threaded eyebolts. The present invention provides for quick installation and tensioning of filter bags, thereby improving overall personnel safety and efficiency by minimizing personnel exposure to the harsh environment inside the baghouse during bag replacement. Additionally it is noted that the mechanism of the present invention is not subject to the galling and corrosion induced failures prevalent in tensioning devices such as threaded fasteners.

Other objects and advantages of the present invention will become readily apparent upon a consideration of the following description and illustrations in which:

FIG. 1 schematically illustrates in section a baghouse gas filtering apparatus having a plurality of filter bags disposed therewithin and supported at their respective upper ends by tensioning devices constructed in accordance with the principles of the present invention;

FIG. 2 is an enlarged fragmentary portion of FIG. 1, partly in section, illustrating the filter bag tensioning device of the present invention;

FIG. 3 is a side view, partly in section, of the filter bag tensioning device of FIG. 2 substantially as seen from line 3—3 of FIG. 2; and FIG. 4 is a schematic illustration of another embodiment of a filter bag tensioning device constructed in accordance with the principles of the present invention.

A baghouse gas filtering apparatus such as that generally indicated at 10 in FIG. 1 comprises a baghouse 20 wherein is disposed a plurality of elongated, vertically extending, horizontally spaced filter bag assemblies 30. Assemblies 30 are affixed therewithin in axial tension intermediate a baghouse thimble floor 14 located adjacent the lowermost ends of assemblies 30 and a rigid filter bag support frame 16 spaced upwardly from the uppermost ends of assemblies 30. Each assembly 30 comprises: an elongated, tubular, flexible cloth filter bag 32; a lower filter bag retaining assembly 34 suitably secured to floor 14 and retaining the adjacent lower end portion of bag 32 in the operational position thereof; and an upper filter bag retaining assembly 36 secured by means of a filter bag tensioning device 62 of the present invention to support frame 16 and retaining the adjacent upper end portion of bag 32 in the operational position thereof. Each of a plurality of dust collecting hoppers 44 rigidly affixed to the lower side of floor 14 subjacent some of assemblies 30 communicates with the inner confines of respective filter bags 32 through suitable well known passageway means (not shown) extending therebetween in assemblies 34 and floor 14.

The baghouse gas filtering apparatus 10 additionally includes well known means such as a blower 40 and cooperable passageway means 41 to direct a particulate laden gaseous stream through hoppers 44 and upwardly into the inner confines of bags 32 as illustrated by arrows A in FIG. 1. The stream is then filtered through the fabric of bags 32 to deposit the particulate matter entrained in the stream thereon, and thence is passed to the atmosphere through a plurality of vents 22 in baghouse 20.

A more completely detailed description of the baghouse filtering apparatus 10 is not included herein inasmuch as such apparatus is well known to those versed in the art and in any case a detailed description thereof is not requisite for an understanding of the present invention. Applicant hereby refers to U.S. Pat. No. 3,095,289 for a description of one such baghouse filtering apparatus.

Referring to FIGS. 2 and 3, there is illustrated the tensioning device 62 of the present invention communicating in tension sustaining engagement vertically between one of assemblies 36 and a member 16' of frame 16. The assembly 36 is shown as comprising a generally cylindrical thimble 56 which sealingly retains about the outer periphery thereof the uppermost end of one filter bag 32 by any suitable means as for example by an adjustable hoop 58 which is fitted about the outer periphery of thimble 56 to secure the bag 32 therebetween. Thimble 56 additionally includes a hook 60 rigidly affixed centrally atop a generally transverse, solid, uppermost end 57 thereof and extending generally upwardly therefrom.

As shown, the tensioning device 62 comprises: a pair of identical elongated ratchet bars 66 (FIG. 2); an elongated generally U-shaped hanger 82 adapted to be supported by ratchet bars 66 and axially movable with respect thereto and further adapted to support a filter bag assembly 30 adjacent the lower end thereof; and a biasing means such as an elongated helical spring 78 cooperable with hanger 82 and ratchet bars 66 to provide a biasing force therebetween.

Each ratchet bar 66 includes a longitudinal edge 67 comprising: a ratchet portion 68 formed on an upper portion 70 of the bar 66, the ratchet 68 having ratchet teeth 68' which protrude generally outwardly and downwardly of the longitudinal extent of the edge 67; an upwardly facing stepped seat 72 formed adjacent the lowermost end of the bar 66 and vertically spaced from portion 70; and an intermediate guiding portion 71 extending intermediate portions 70 and 72. Each bar 66 additionally has a raised dimple 80 located adjacent the uppermost end of its portion 71.

The ratchet bars 66 are shown as being pivotally secured together to form a scissors-like structure as follows: at a point intermediate the axial ends of portion 71 the bars 66 are pivoted by means of a transversely extending pivot pin 76 such that respective ratchets 68 and seats 72 are transversely adjacent each other and the edges 67 face opposite directions.

As seen in FIG. 3 hanger member 82 comprises: a pair of vertically extending legs 81 having hooked upper end portions 84; and a generally transverse lower end or base portion 85 which joins the legs 81 adjacent the lowermost ends thereof. In assembly, bars 66 are received within the hanger 82 in a manner that hanger 82 straddles bars 66 and is movable axially with respect thereto to an upper position whereat hook portions 84 are adjacent the upper end of portion 71 and to a lower position whereat portions 84 are spaced downwardly from the upper end of portion 71.

Bars 66 and hanger 82 cooperate to releasably retain helical spring 78 within tensioning device 62 in a manner that the lower end of spring 78 is releasably and captively received by seat 72 and the upper end thereof is captively received by hooks 84 to provide support for hanger 82 by bars 66. In addition to providing supporting communication between hanger 82 and bars 66, spring 78 also provides an axial bias therebetween as is obvious from the very nature of the spring 78. A transverse inward bias upon bars 66 is provided by the lowermost coil of spring 78 which is expanded transversely to engage a widened portion 73 of seat 72. It is to be understood that such inward bias may be provided by other means such as a spring biased O-ring engaging the seat portion 73.

The tensioning device 62 provides means to adjustably and releasably retain a filter bag 32 as well as providing a uniform longitudinal tension as follows. Each filter bag 32 is suitably retained at its lowermost end in the operational position thereof by one of lower bag retaining assemblies 34 as hereinabove noted. At its upper end the bag 32 is secured to thimble 56 in any suitable manner as for example by the hereinabove described hoop 58. To retain the upper end of bag 32 in its operational position the hanger portion 85 of tensioner 62 engages hook 60, and the ratchets 68 are received into an upwardly and inwardly tapered bore 86 in member 16' whereupon transversely opposite teeth 68' engage the upper surface of member 16' adjacent bore 86. Such engagement of teeth 68' is maintained by an outward bias thereof upon the periphery of bore 86 induced by the hereinabove described inward bias of spring 78 against seat portion 73 acting through the scissors-like pivotal relationship of bars 66.

The bag 32 is tensioned as follows by a manually produced pendulum-like rocking of the lower end of tensioning device 62 to the left and right of vertical and generally outwardly from edges 67. When tensioner 62 is rocked to one side the tooth 68' engaging the member 16' on that side is lifted upwardly therefrom and the subjacent tooth 68' on the same side slides upwardly and inwardly along the taper of bore 86 until it overrides the upper lip of bore 86. Thereupon such tooth 68' engages the member 16' as it is forced outwardly by the inward bias provided by spring 78 against seat portion 73 acting through the hereinabove described scissoring action of bars 66. Inasmuch as rocking the tensioner 62 in the opposite direction produces a like result, repeated rocking of tensioner 62 alternately from side to side indexes ratchets 68 upwardly through bore 86 in increments of one tooth. As the ratchets 88 are indexed upwardly the spring 78 is compressed in small increments between seat 72 and hook portions 84. The incremental compression of spring 78 upwardly biases hanger 82 and consequently induces a controlled, incremental tension in the bag 32 suspended therefrom.

Inasmuch as the tension typically applied to a filter bag is substantially larger than the weight of the bag assembly, the tension so applied depends substantially on spring compression and is not significantly affected by variations in bag length or weight. Accordingly, the location of dimple 80 marks the degree of spring compression required to produce the desired tension, and thus in practice the tensioning device 62 is indexed upwardly as hereinabove described until the uppermost end of spring 78 is aligned with dimple 80. The tension thus imposed in bag 32 is substantially equal for all such tensioning operations.

To relieve or reduce the tension load imposed upon bag 32 the uppermost end portions 70 of ratchet bars 66 are manually squeezed together by such means as suitable pliers to overcome the outward bias of the ratchets 68 whereby the teeth 68' disengage from the member 16' and the tensioning device may be adjusted downwardly in bore 86 or may be removed therefrom entirely. It is to be understood that the ratchets 68 may be disengaged from bore 86 by suitable alternate methods which take advantage of the hereinabove mentioned scissors-like pivotal relationship of bars 66, such as by means of a suitable screwdriver or similar flat blade-like instrument inserted into a notch 24 formed between bars 66 subjacent pivot 76 (FIG. 2) and turned 90 degrees so as to exert an outward bias on notches and thereby overcome the outward bias of ratchets 68 on the bore 86.

It is of course to be understood that the embodiment disclosed hereinabove is but one of numerous contemplated embodiments of the present invention. An alternative embodiment is illustrated in FIG. 4 as an elongated U-shaped tensioning device 88 having outwardly spring biased ratchet portions 90 adjacent the upper ends thereof which engage upwardly and inwardly tapered bores in 92 in a support member 94. The tensioner 88 may be indexed upwardly through bores 92 by the pendulum-like rocking motion previously discussed, and may be released from bores 92 by an inward bias applied for example to the uppermost end portions of tensioner 88 as hereinabove related.

As an additional alternative embodiment it is noted that the outward bias of ratchets 68 in tensioner 62 (FIGS. 2 and 3) may be achieved for example by means of legs 66 being rigidly secured together (not shown) at their lower ends, or by an elongated elastomeric core (not shown) such as rubber carrying the legs 66 in lieu of the spring biased scissors action hereinabove described.

It will be evident to those versed in the art that tensioning device 62 and the various alternative embodiments thereof may be employed in conjunction with a wide variety of baghouse gas filtering equipment, and in other gas flow applications such as in an inflatable bag valve. Furhermore, it is noted that tensioner 88 is shown as providing no spring bias tension loading and therefore could be used in applications where the tension to be applied need not be adjustable in small increments such as the securing of tarpaulins on pallets or truck beds or the securing of sailing craft rigging. The tensioner 62 of FIGS. 2 and 3 could also be constructed without a vertical biasing means for similar uses.

Inasmuch as the present invention comprises a tensioning device wherein a manually actuated ratchet retains a tension load and provides incremental increases thereof, numerous modifications thereto may well occur to those skilled in the art. For example, the spring rate and length of spring 78 might be of numerous alternative values; and the dimple 80 might alternatively be a scale indicating tension in pounds or other applicable units. These and other alternative embodiments and modifications having been envisioned and anticipated it is requested that this invention be interpreted broadly and limited only by the scope of the claims appended hereto.

What is claimed is:

1. An elongated retaining device comprising: a body member having one end portion thereof adapted to support a supported member therefrom and having an outwardly biased bifurcated portion adjacent the other end portion thereof; and each of the legs of said bifurcated portion including retaining means extending longitudinally therealong which are adapted to be cooperable with a seating portion of a supporting member to selective retain said body member at any of a plurality of locations therealong with respect to such a seating portion by overcoming the bias of said bifurcated portion and seating a selected section of said retaining means on such a seating portion.

2. A retaining device as specified in claim 1 wherein said retaining means are a plurality of ratchet teeth extending longitudinally along the exterior sides of said legs.

3. A retaining device as specified in claim 1 wherein said body member comprises a pair of independent elongated sections which are pivotally joined together intermediate the axial ends thereof in scissor like fashion.

4. A retaining device as specified in claim 3 wherein said legs are the portion of said independent elongated sections on one side of the pivot axis.

5. A retaining device as specified in claim 4 additionally including means applying an inward biasing force to the portion of said independent elongated sections on the other side of the pivot axis.

6. A retaining device as specified in claim 5 additionally including an additional elongated member adapted to carry such a supported member adjacent one end portion thereof and being supported by said first mentioned member adjacent the other end thereof.

7. A retaining device as specified in claim 6 additionally including a biasing means disposed intermediate said first mentioned member and said another member and being cooperable therewith to bias said members away from each other.

8. A retaining device as specified in claim 2 wherein the seating portion comprises a bore extending through such a supporting member and said ratchet teeth are selectively seated on such a supporting member outwardly adjacent a peripheral portion of said bore.

9. In a dust collecting baghouse assembly wherein a filter bag assembly is supported between spaced support structures and an elongated tensioning device adjustably communicates between one end of said filter bag assembly and the one of said support structures adjacent thereto, the improvement comprising: said tensioning device comprising a body member having one end portion thereof adapted to support said one end of said filter bag assembly therefrom and having an outwardly biased bifurcated portion adjacent the other end portion thereof; and each of the legs of said bifurcated portion including retaining means extending longitudinally therealong which are adapted to be cooperable with a seating portion of said one of said support structures to selectively retain said body member at any of a plurality of locations therealong with respect to said seating portion by overcoming the bias of said bifurcated portion and seating a selected section of said retaining means on such a seating portion.

* * * * *

UNITED STATES PATENT OFFICE
CERTIFICATE OF CORRECTION

PATENT NO. : 3,881,673
DATED : May 6, 1975
INVENTOR(S) : Harley G. Peterson

It is certified that error appears in the above-identified patent and that said Letters Patent are hereby corrected as shown below:

ON THE FRONT PAGE

In the citation of U. S. Patent 1,577,133 delete "Learnikan" and substitute -- Learnihan --;

In the citation of U. S. Patent 3,812,660 delete "Vanderhoech" and substitute -- Vanderhoeck --;

In the citation of Swedish Patent 58,220 delete "6/1923" and substitute -- 3/1923 --;

IN THE SPECIFICATION AND CLAIMS

Column 4, line 25, after "notches" insert -- 24 --;

Column 4, line 34, after "bores" delete -- in --;

Claim 1, line 9, delete "selective" and substitute -- selectively --.

Signed and Sealed this twenty-first Day of October 1975

[SEAL]

Attest:

RUTH C. MASON
Attesting Officer

C. MARSHALL DANN
Commissioner of Patents and Trademarks